April 6, 1943.  A. C. FISCHER  2,315,949
FERTILIZING BY CARTRIDGES
Filed July 3, 1940

Inventor.
ALBERT C. FISCHER
By Knight Bros.
Attorney.

Patented Apr. 6, 1943

2,315,949

UNITED STATES PATENT OFFICE 2,315,949

FERTILIZING BY CARTRIDGES

Albert C. Fischer, Chicago, Ill.

Application July 3, 1940, Serial No. 343,902

7 Claims. (Cl. 47—1)

This application is a continuation-in-part of my application Serial No. 8,715, filed February 28, 1935 (refiled June 10, 1940, Serial No. 339,830) entitled "Fertilizer, insecticide, and seed distribution"; and it relates to a method of and an article of manufacture for use in gradually delivering and distributing moisture, fertilizer, and other conditioning media, such for instance, as mineral reagents, and/or insecticides, at selected points in growing-soils surrounding the root systems of vines, small fruits, shrubs, trees and the like, all of which are understood to be contemplated in the term "plants" as hereinafter used.

It is the object of the present invention to provide an improved article for conditioning soil to influence favorably the growth of plants therein by introducing the soil conditioning medium into the hole in a form that causes the medium to be paid out gradually, as needed by the plant, through means of a vehicular supply of moisture which takes the conditioning medium into solution and thus not only converts it into condition available to the plant, but so widens its distribution through the soil as to avoid the congested growth that results from excitation of tropism in a root system by a mass of fertilizer concentrated at a single point, as in established practice. These objectives are realized by the utilization of a coiled fertilizing cartridge which is inserted in the soil.

The invention proceeds upon the principle of forming a sheet-like body of fertilizer or other desired soil treating medium or media and rolling this sheet-like body, with or without a hollow core, into a series of superposed convolutions that form a self sustaining cartridge the diameter of which, influenced mainly by the thickness and the number of convolution in the roll, and corresponding approximately to the diameter of the fertilizing hole that is to receive the cartridge, is adjustable to cause it to snugly fit the hole by relative circumferential movement of the superposed convolutions sufficient to cause partial unwinding of the sheet and consequent enlargement of the roll to a diameter that snugly fits the hole and maintains good capillary contact between the roll and the soil; and the length of the roll, according to the technique followed, corresponding with the depth of the hole, or approximately the vertical dimension of the zone of soil occupied by the system of feeder roots; or being such as will determine the "dose" of treating medium which it is desired to administer to the plant.

A preferred embodiment of the invention is described below, taken in conjunction with the accompanying drawing.

In the accompanying drawing—

Figure 4:
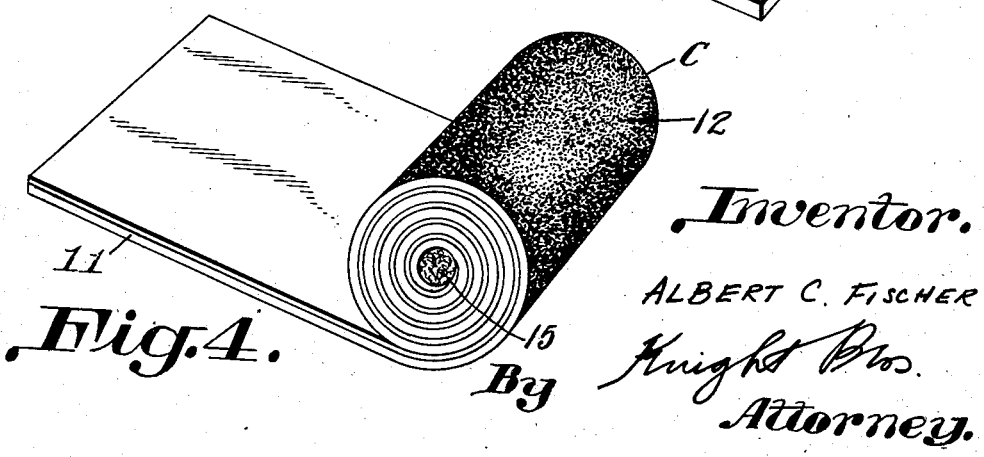

Figure 4 suggests a method of procuring a coiled sheet-like body having an adhered coating of fertilizer.

Referring to the drawing more in detail, A represents a portion of a plant propagating bed; B suggests a plant growing therein and C represents a cartridge constructed in accordance with the present invention and introduced into a hole in the bed within fertilizing distance of the plant.

Figure 1:
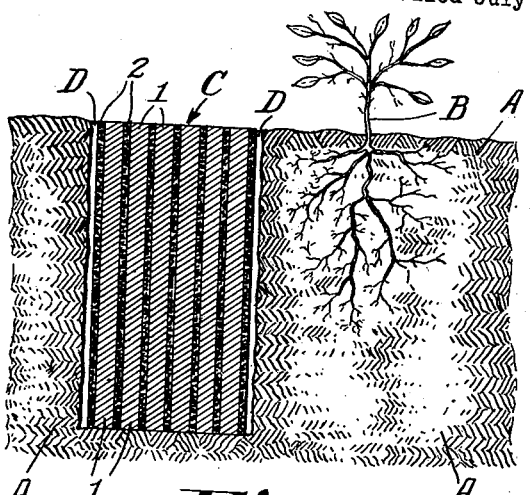
Figure 1 is a vertical sectional view of a portion of a bed of plant-growing soil into which has been introduced a fertilizing body constructed in accordance with the invention and which is tightly coiled and leaving a free space surrounding said body.

In Figure 1 the cartridge C comprises convolutions 1 of a sheet-like body having subdivided fertilizing media 2 adhered to one surface thereof, and coiled tightly so that it may readily be introduced into a fertilizing hole preferably having a diameter sufficient to leave a space D around the cartridge.

Figure 2:
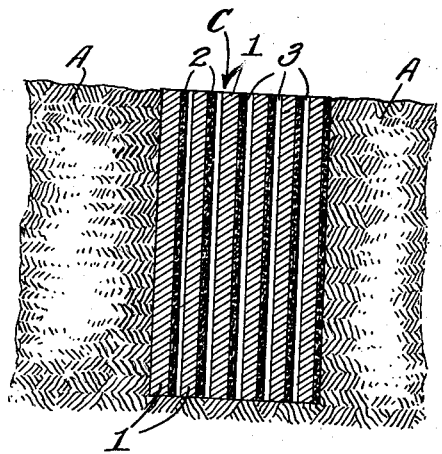
Figure 2 is a similar view showing the coiled body after automatic release of its convolutions and partial uncoiling to leave it contacting the confines of the hole and leaving spaces between the convolutions.

In Figure 2 the cartridge is represented as having been automatically released by moisture so that its convolutions 1 with their coating of fertilizer 2 have partially uncoiled and left spaces 3 between the convolutions, in which accumulating moisture may gain access to and dissolve the fertilizer of the coating or that incorporated within the structure of the coiled body, or both said sources of fertilizer and thereby amplify the released plant food.

Figure 3:
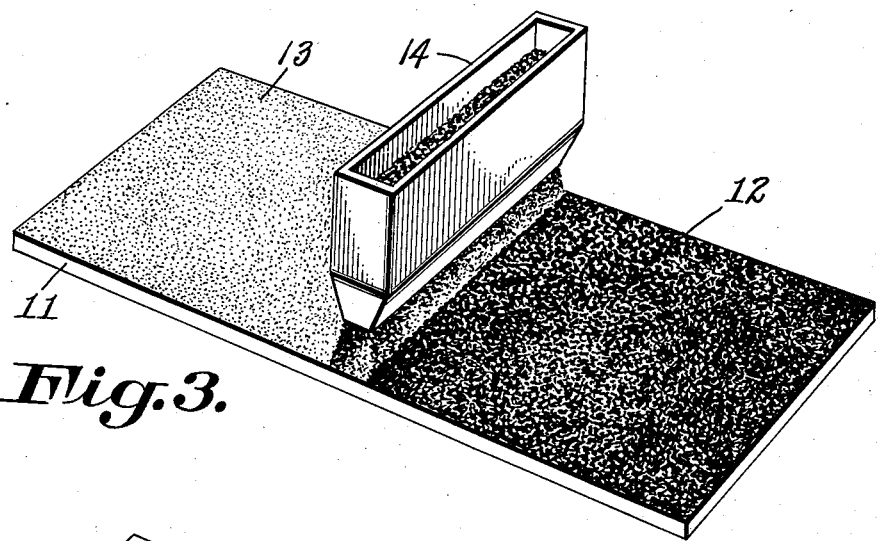
Figure 3 is a schematic view indicating a method of providing a coating of subdivided fertilizer adhered to the sheet-like body.

Figure 3 shows a method of fabrication of the fertilizing material and consists of the passage of a web 11 of decomposable material such as paper coated with an adhesive 13 such as gelatinous coatings of glue, mucilage or the like upon which is spread finely divided fertilizing material such as ammonium sulfate, or aluminum sulfate, or any other combination of fertilizing sheets which may be contained in the receptacle 14 and which is deposited on to the web 11 as the same travels therebelow as shown in Figure 3. If desired, the receptacle 14 may contain phosphates, blood and bone, tankage and other like materials.

Figure 4 shows the web prepared in the manner illustrated in Figure 3 rolled upon a central core 15 which may be ground straw, preparatory to the insertion of the rolled cartridge into the earth. If desired, the web 11 may be impregnated with soluble soil treating media such as solutions of sodium nitrate prior to the coating thereof with the adhesive material upon which is deposited the powdered fertilizer 12.

Colloidal binder incorporated in the cartridge may exercise its hygroscopic function and absorb and arrest the moisture necessary to digest or render available the treating medium forming an ingredient of the cartridge.

Those ingredients of the cartridge included primarily to lend physical integrity to the cartridge or to the sheet of which it is made, including any hollow or other form of central core that may be used, are of such nature that they will decay or otherwise disintegrate after they have served their purpose, and pass into the soil as ingredients beneficial to the soil.

Compared with the wasteful practice of pouring subdivided fertilizing material into the hole and permitting such material to settle to the bottom and to pass on to lower strata of soil by seepage, as fast as the fertilizer becomes dissolved, the present invention delivers the solution by capillarity from a vertically extensive surface of the absorbent cartridge to the absorbent soil that constitutes the vertically extensive confines of the hole and thereby places the medium in the zone of the soil occupied by the feeder roots. Until the transfer by capillarity or absorption into the soil from the cartridge, the values remain absorbed in the cartridge. By locating the holes each year at the radial distance from the root-center, which is appropriate to the age of the plant; by selection of spacing of the holes in the circumference determined by said radius; and by having the vertical dimension of the cartridges appropriate to the depth of soil zone occupied by the roots, the present invention produces the novel effect of widely distributing the medium throughout the cylindrical feeding zone appropriate to the continually developing root system from year to year, inducing healthy spreading and distribution of the rootlets horizontally, as distinguished from ingrowing confusion toward restricted points of concentrated plant food and establishing a generally more desirable development of plant structure.

The invention contemplates, in addition to the advantageous procedure just described, and as an instrumentality for realizing such procedure, an elongated cartridge serving as a vehicle for a soil-treating medium and adapted to not only excite tropism in a root system through a mass of soil measured vertically as well as radially in relation to the root system, but to absorb and hold a solution of such medium in storage, and by contacting the absorptive confines of a hole in the soil, gradually give off to the soil for distribution by capillarity or absorption, a supply of the medium which materially enlarges the area of tropic effect and feeding range. The invention further contemplates a bibulous vehicular body for soil treating media, having a large exposure area or medium bearing surface gathered into a small space by rolling, but still remaining accessible to moisture needed for solution of the values which such surface bears, and which, by such gathering into rolled form greatly facilitates manipulation and introduction through the hole and into the soil, and by selection of its longitudinal dimension, affords a convenient regulation of dosage in its use.

I claim:

1. As an article of manufacture; a soil-treating cartridge comprising a sheet-like body coiled into separable convolutions and having incorporated therewith a soil-treating medium; the convolutions being superimposed one upon another and being circumferentially movable relatively one to another to partially unwind them and cause their separation.

2. A soil-treating cartridge comprising a coiled sheet-like body of absorbent material having a soil treating medium incorporated therein; the convolutions being separable by partial unwinding and by their separation increasing access of moisture to the surface of the sheet and the giving of plant treating medium carried thereby.

3. A soil-treating cartridge comprising a coiled sheet-like body of absorbent material composed of fibrous substance, a water-soluble binder temporarily holding the convolutions against opening and a soil-treating medium given off by surfaces of the convolutions when the body is partially uncoiled.

4. A soil-treating cartridge comprising a sheet-like body of material coiled into convolutions that collectively compose an elongated stem adapted to be introduced into a fertilizing hole adjacent to a plant; said sheet-like body having incorporated with it a water soluble soil-treating medium and said stem having its convolutions separable by partial unwinding, to cause expansion of the coiled body into contact with the confines of the hole, but leaving said body with structural integrity that enables it to retain erect position and continue to transfer moisture containing the treating medium to the confines of the hole throughout the length of the stem until the supply of treating medium is substantially exhausted.

5. A soil treating cartridge as described in claim 1, having an interior water receiving space.

6. A soil treating cartridge comprising a sheet-like vehicle containing a soil-treating medium and coiled into convolutions separable by partial unwinding and by their separation adapted to provide water trapping space.

7. A soil-treating cartridge comprising a sheet-like body having incorporated therein a water-soluble soil treating medium adhered by a water-soluble adhesive to the surface of said body; said body being coiled into convolutions and its convolutions being separable by partial uncoiling of the body and by their separation exposing surfaces of the convolutions to moisture.

ALBERT C. FISCHER.